United States Patent
Fisher et al.

(10) Patent No.: US 7,826,191 B1
(45) Date of Patent: Nov. 2, 2010

(54) DYNAMIC CURRENT LIMITING FOR SWITCHING REGULATORS

(75) Inventors: Allan A. Fisher, Tokyo (JP); Yoshimichi Kose, Tokyo (JP)

(73) Assignee: National Semiconductor Corporation, Santa Clara, CA (US)

( * ) Notice: Subject to any disclaimer, the term of this patent is extended or adjusted under 35 U.S.C. 154(b) by 569 days.

(21) Appl. No.: 11/748,317

(22) Filed: May 14, 2007

(51) Int. Cl.
  *H02H 9/02* (2006.01)
(52) U.S. Cl. .................................... 361/93.1
(58) Field of Classification Search ............... 361/93.1
  See application file for complete search history.

(56) References Cited

U.S. PATENT DOCUMENTS

| | | | | |
|---|---|---|---|---|
| 4,127,885 A | * | 11/1978 | Adam et al. | 361/18 |
| 5,612,610 A | | 3/1997 | Borghi et al. | |
| 6,101,104 A | * | 8/2000 | Eng | 363/21.06 |
| 6,396,252 B1 | | 5/2002 | Culpepper et al. | |
| 7,170,272 B2 | * | 1/2007 | Yoshida | 323/284 |

OTHER PUBLICATIONS

Roncoroni, M., Designing With the L4963 Monolithic Discontinuous Mode Power Switching Regulator, AN458 Application Note, Dec. 2003, pp. 1-19, STMicroelectronics, www.st.com.

* cited by examiner

*Primary Examiner*—Stephen W Jackson
*Assistant Examiner*—Scott Bauer
(74) *Attorney, Agent, or Firm*—Frommer Lawrence & Haug LLP; Matthew M. Gaffney

(57) ABSTRACT

A circuit for dynamically controlling current limit protection in switching regulators. The circuit selectively disables the switching circuit of the regulator in response to the detection of an over-current condition. During the over-current condition, the voltage at a switch node is substantially determined by the forward voltage of a diode. This forward voltage is relatively constant as long as there is more than nominal forward current through the diode. As the current through an output inductor and the forward current through the diode approaches zero, the forward voltage of the diode decreases from the relatively constant value. This drop of the diode forward voltage is detected and used to determine the termination of the over-current condition.

20 Claims, 7 Drawing Sheets

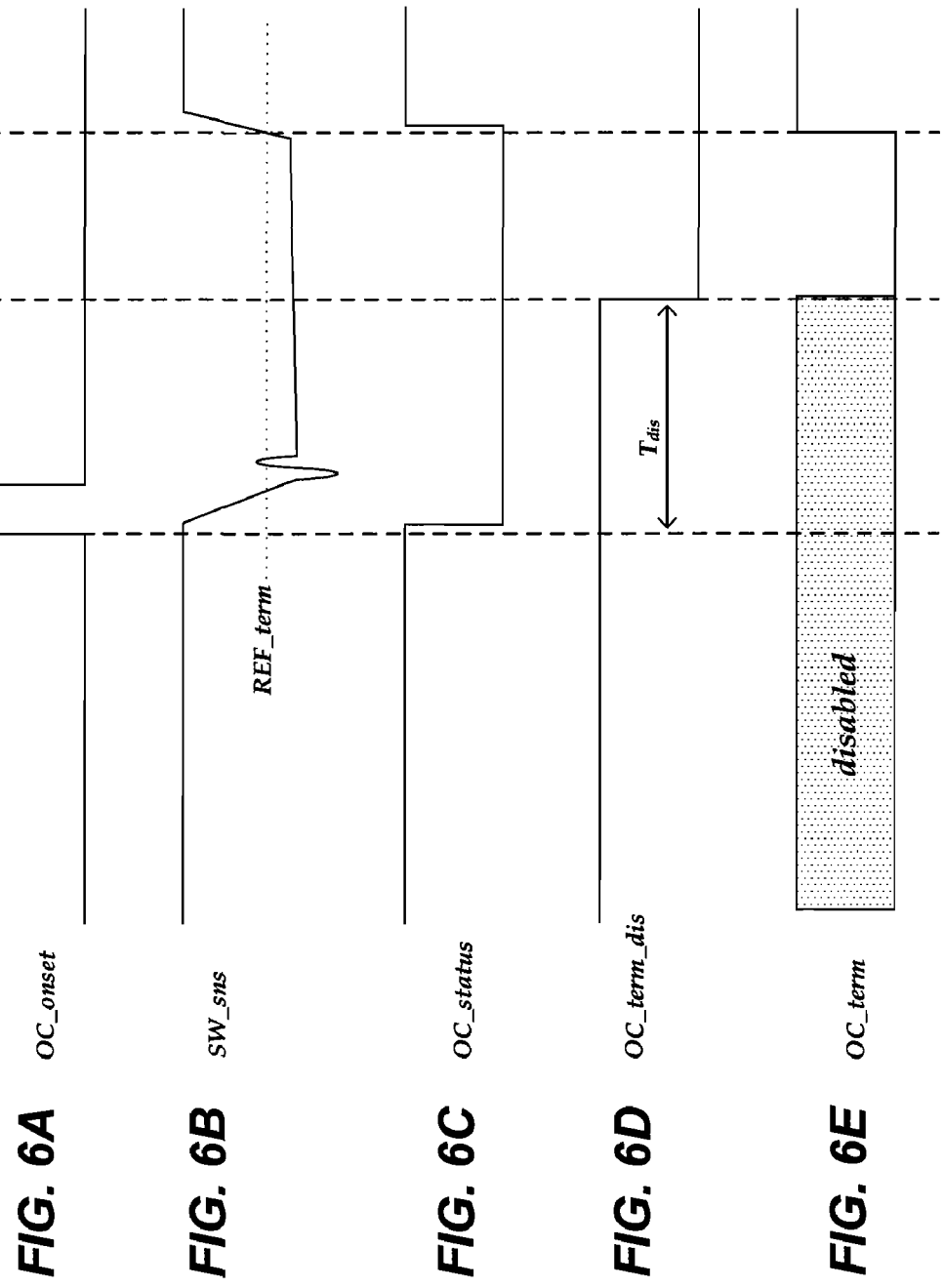

DYNAMIC CURRENT LIMITING FOR SWITCHING REGULATORS

TECHNICAL FIELD

The invention is generally directed to the area of the power regulation. The invention is directed, particularly, but not exclusively to an apparatus and a method for providing dynamic current limit protection in switching regulators.

BACKGROUND

In electrical systems switching regulators, are often used to supply power (voltage or current) to a load. Certain conditions, failures, settings, short-circuits, or operational modes may cause the load to consume more current than the regulator can continuously provide or more current than the load should continuously consume. These and other over-current situations may result in degraded system performance, damage to the regulator, damage to the load, unsafe or hazardous conditions, and/or the like.

Switching regulators often include active current limiting circuitry to prevent over-current conditions. Active current limiting circuitry may be used, for example, to sense the onset of an over-current situation and open a switch circuit, hold open a switch circuit, prevent a switch circuit from closing, and/or the like, to selectively disable the transfer of additional energy. This circuitry provides some time for energy to be dissipated by the load or other circuitry before the switch circuit is again closed to transfer additional energy.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 6A-6E are timing diagrams illustrating waveforms of embodiments of signals of one embodiment of a regulator controller according to aspects of the present invention.

DETAILED DESCRIPTION

Figure 1:
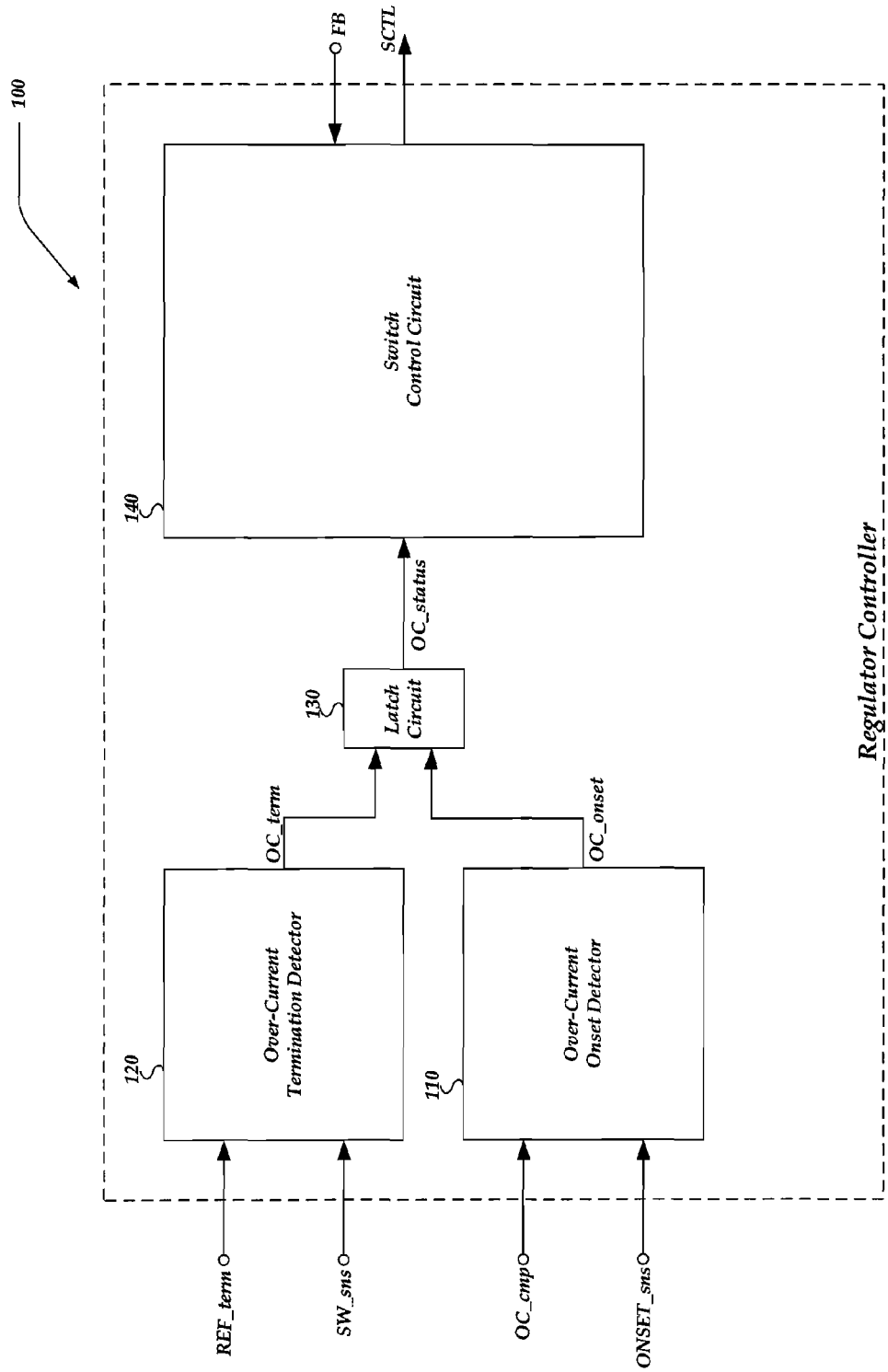
FIG. 1 is a block diagram of one embodiment of a regulator controller according to aspects of the present invention.

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention is generally related to circuitry and a method for dynamically controlling current limit protection in switching regulators. The circuit and method selectively disables the switching circuit of the regulator in response to the detection of an over-current condition. During the over-current condition, the voltage across a diode is substantially determined by the forward voltage of the diode. This forward voltage is relatively constant as long as there is more than nominal forward current through the diode. As the current through an output inductor and the forward current through the diode approaches zero, the forward voltage of the diode decreases from the relatively constant value. This drop of the diode forward voltage is detected and used to determine the termination of the over-current condition.

FIG. 1 is a block diagram of an embodiment of regulator controller 100. Regulator controller 100 includes over-current onset detector 110, over-current termination detector 120, latch circuit 130, and switch control circuit 140. Regulator controller 100 is arranged to receive over-current termination threshold signal REF_term, switch node sense signal SW_sns, over-current onset comparison signal OC_cmp, over-current onset sense signal ONSET_sns, and feedback signal FB; and is further arranged to provide switch control signal SCTL.

Regulator controller 100 is arranged to control power regulation by providing switch control signal SCTL to a switch circuit. For example, regulator controller 100 may provide switch control signal SCTL based, at least in part, on feedback signal FB. In one embodiment, feedback signal FB is associated with an output voltage or output current of the regulator and is used to provide negative feedback control to regulator controller 100. Regulator controller 100 also provides current limit protection control for the regulator. For example, certain conditions may cause the regulator to go into an over-current condition despite use of a feedback loop. An over-current condition may be caused by a short-circuit in the load, failure of the load, failure of the regulator, change in operating conditions, and/or the like. Also, an over-current condition may relate to the magnitude or value of an output current, an inductor current, a switch circuit current, a diode current, a load current, a leakage current, a current imbalance, and/or the like.

Over-current onset detector 110 is arranged to receive over-current onset comparison signal OC_cmp and over-current onset sense signal ONSET_sns, and to provide over-current onset detection signal OC_onset. For example, over-current onset detection signal OC_onset may be asserted to indicate that over-current onset detector 110 has detected the onset of an over-current condition. In one embodiment, over-current onset detector 110 employs a comparator (not shown in FIG. 1) to compare signal OC_cmp to signal ONSET_sns. In other embodiments, delay circuits, hysteresis circuits, enable circuits, integration circuits, derivation circuits, and/or the like, may be employed to detect the onset of an over-current condition. For example, these and other circuits may be used to gate the assertion of the over-current onset detection signal OC_onset during certain conditions or lengths of time, detect the onset of an over-current condition based on a change in current or voltage, based on the level of a current or voltage over a length of time, and/or the like. In addition, elements of known over-current protection circuitry may also be suitably employed to detect the onset of an over-current condition.

Over-current termination detector 120 is arranged to receive over-current termination threshold signal REF_term and switch node sense signal SW_sns, and to provide over-current termination detection signal OC_term. For example, over-current termination detection signal OC_term may be asserted to indicate that over-current termination detector 120 has detected the end of an over-current condition. In one embodiment, over-current onset detector 110 employs a comparator (not shown in FIG. 1) to compare signal SW_sns to signal REF_term. In other embodiments, other circuits and techniques, including those discussed above with reference to over-current onset detector 110, may be suitably used to control the assertion of over-current termination detection signal OC_term.

Latch circuit 130 is arranged to receive signals OC_onset and OC_term from over-current onset detector 110 and over-current termination detector 120, respectively. Latch circuit 130 is further arranged to provide over-current condition status signal OC_status to indicate whether over-current onset detector 110 and over-current termination detector 120 have determined that the regulator is in an over-current condition. In one embodiment, signal OC_status is a digital signal that is asserted to indicate that the regulator is not in an over-current condition. For example, latch circuit 130 may be arranged to assert signal OC_status if signal OC_onset is asserted and to de-assert signal OC_status if signal OC_term is asserted. However, in other embodiments, the logic levels on signal OC_status may be inverted, or signal OC_status may be a single signal or multiple signals and may be used to indicate other or additional information regarding the status of the regulator. Latch circuit 130 may be either an analog or digital circuit and may be state based or combinatorial logic based.

In one embodiment, switch control circuit 140 is arranged to receive input signals OC_status and FB, and is further arranged to provide switch control signal SCTL to control a regulator switch circuit. In one embodiment, signal SCTL may be provided based primarily on the value on feedback signal FB. Also, switch control circuit 140 may be arranged to gate or otherwise suppress the assertion of switch control signal SCTL while signal OC_status is asserted. In another embodiment, switch control circuit 140 may be arranged to otherwise modify the assertion of switch control signal SCTL while over-current condition status signal OC_status is asserted. For example, signal SCTL may be asserted for shorter pulses, driven at a different level, driven at a different frequency, and/or the like.

In one embodiment, switch control circuit 140 includes drivers and/or level shifters which directly drive a switch circuit. In other embodiments, switch control circuit 140 includes additional logic and/or is arranged to receive additional control inputs. For example, switch control circuit 140 may include a hysteretic controller, a one-shot, a PWM drive circuit, a temperature limit circuit, mode controllers, and/or the like. Switch control circuit 140 may also be arranged to receive a clock signal, various reference voltages, temperature limits, temperature indicators, mode selection signals, enable signals, and/or the like.

In at least one embodiment, regulator controller 100 differs from the illustrated embodiment. For example, over-current termination threshold signal REF_term may be internally generated by regulator controller 100 or may be derived from a single internal or external reference source. In another example, certain input signals may be combined into a single input provided from or by a single source. For example, signals SW_sns and OC_cmp may be a single signal that is driven from a switch node of a switching regulator. In another example, input signals OC_cmp and FB may be a single signal provided from or by a single source, such as an output node of a regulator. These and other embodiments are within the spirit and scope of the invention.

Figure 2A:
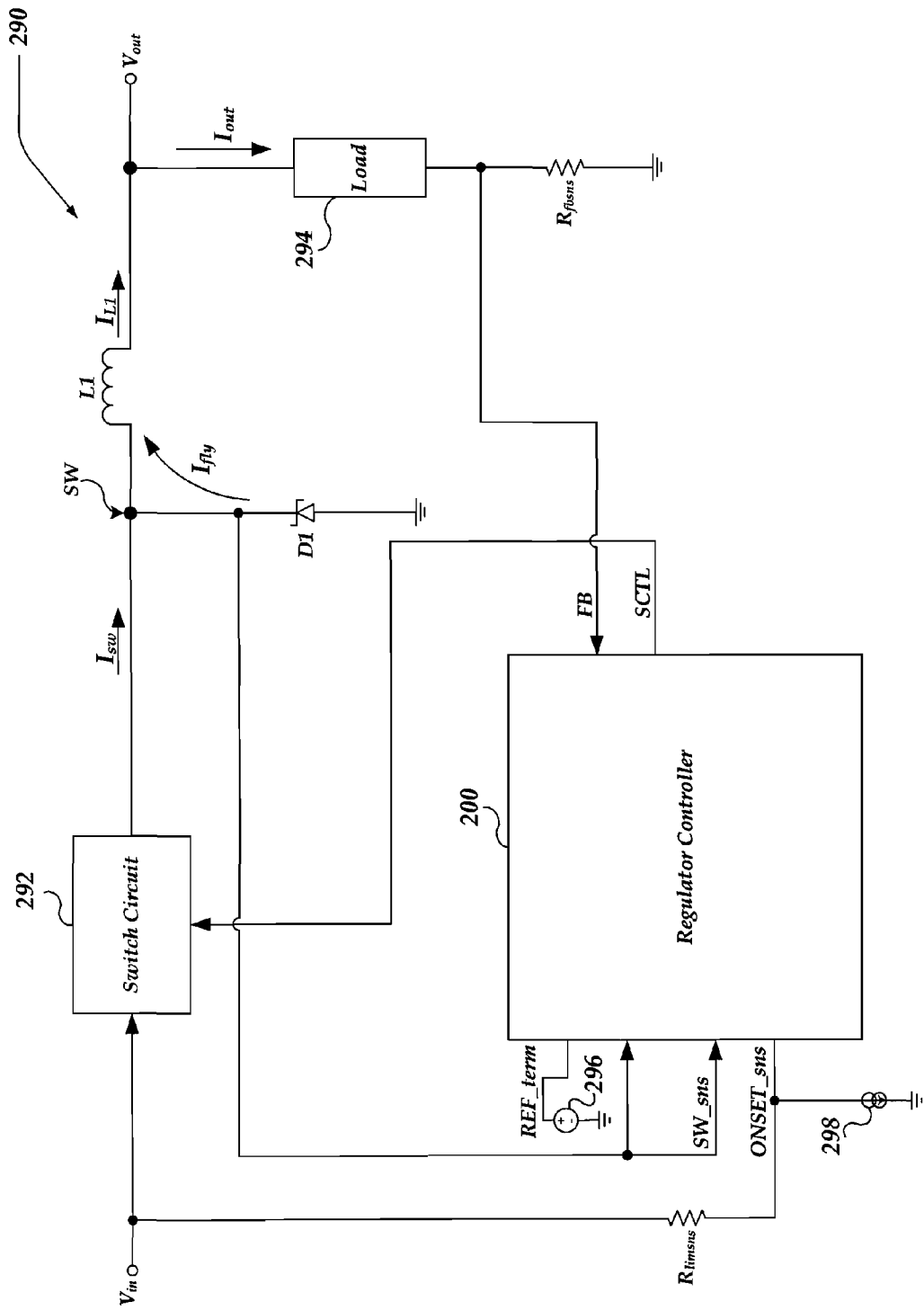
FIGS. 2A-B are block diagrams of embodiments of current regulators according to aspects of the present invention.

FIG. 2A is a block diagram of an embodiment of current regulator 290. Regulator 290 includes regulator controller 200, switch circuit 292, load 294, reference sources 296-298, inductor L1, diode D1, feedback sense resistor $R_{fbsns}$, and limit sense resistor $R_{limsns}$. Regulator controller 200 may be employed as an embodiment of regulator controller 100 of FIG. 1, where reference source 296 is connected to input signal REF_term, reference source 298 is connected to input signal ONSET_sns, and input signals SW_sns and OC_cmp represent the voltage at switch node SW. In other embodiments, regulator controller 200 may be any regulator controller within the spirit and scope of the invention.

In the illustrated embodiment, current regulator 290 is a simplified model of a switched mode buck current regulator. In other embodiments, regulator controller 200 may also be suitably used with boost regulators, buck-boost regulators, inverting regulators, fly-back converters, and/or any type of switching regulator. Such regulators may be voltage mode regulators, current mode regulators, and/or the like. Such regulators may also be voltage regulators, current regulators, and/or the like. These and other variations may be employed for regulator 290 without departing from the spirit and scope of the invention.

In one embodiment, switch circuit 292 is arranged to selectively couple node $V_{in}$ to node SW under the control of switch control signal SCTL. In this embodiment, switch circuit 292 consists of one or more switch transistors coupled between node $V_{in}$ and node SW. In one embodiment, the switch transistor is an N-channel MOSFET device. However, P-channel MOSFET devices, BJT transistors, JFET transistors, relays, and/or other electrically controlled switching devices may also be suitably used in this or other embodiments.

In a non-over-current condition mode of operation of one embodiment, regulator controller 290 regulates output current $I_{out}$ by selectively opening and closing switch circuit 292. During an on-time, switch circuit 292 is closed to selectively couple node $V_{in}$ to node SW. During the on-time, current $I_{sw}$ flows from node $V_{in}$ through switch circuit 292 into inductor L1 and also begins supplying load current $I_{out}$ to load 294. Under the control of regulator controller 200, signal SCTL is de-asserted to open switch circuit 292. During this off-time, switch circuit 292 is open and current $I_{fly}$ flows in a loop from ground, through diode D1, and inductor L1 to load 294. Regulator controller 200 selectively opens and closes switch circuit 292, as needed, to regulate output current $I_{out}$ about a desired value.

If, in one embodiment, regulator controller 200 detects the onset of an over-current condition, regulator controller suspends the assertion of switch control signal SCTL until the termination of the over-current condition. In one embodiment, regulator controller senses the voltage across diode D1 to detect the termination of the over-current condition. In the embodiment shown in FIG. 2A, during the off-time of switch circuit 292, current is provided to inductor L1 from ground via diode D1. Accordingly, while more than nominal current flows through diode D1, the forward voltage across diode D1 is substantially equal to a substantially constant intrinsic forward voltage drop for diode D1. It is known in the art that the substantially constant forward intrinsic voltage drop of a diode is defined by intrinsic characteristics of the PN junction and can be expressed as a function of the forward current through the diode. Accordingly, in the illustrated embodiment, the voltage at switch node SW is approximately equal to the negative substantially constant intrinsic forward voltage drop of diode D1 while more than nominal current flows through diode D1.

As the current through inductor L1 and diode D1 decreases to approach approximately zero amps, the voltage across diode D1 decreases and the voltage at switch node SW will rise to approximately zero volts. In one embodiment, regulator controller 200 detects that the voltage at switch node SW approaches zero and ceases suppression of switch control signal SCTL. At this time, regulator controller 200 and regulator 290 return to non-over-current condition operation.

In one embodiment, diode D1 is a Schottky catch diode with a substantially constant intrinsic forward voltage drop of approximately 400 millivolts. However, other barriers may be suitably used and include silicon diodes, germanium diodes, and/or the like. The substantially constant intrinsic forward voltage drop of such diodes are known in the art and range from a few hundred millivolts to a few volts.

As shown in FIG. 2A, reference source 296 is a fixed voltage reference and reference source 298 is a fixed current reference. In other embodiments, reference sources 296-298 are adjusted by other circuitry. For example, reference sources 296-298 may be divided by a potentiometer, divided by voltage divider resistors, divided by parallel current paths, generated by a digital to analog converter, generated by an op-amp circuit, and/or the like (not shown). In one embodiment, reference sources 296-298 may be adjusted during manufacture, by a user, by a microprocessor, by a feedback loop, and/or the like. In one embodiment, reference source 296 is a voltage reference which provides an over-current termination threshold value of approximately −150 millivolts. For example, reference source 296 may be based on a bandgap reference circuit. In one embodiment, reference source 298 is a current mirror.

In other embodiments, the magnitude of the over-current termination threshold value may be set at any suitable value that is less than the substantially constant intrinsic forward voltage drop of diode D1 and which enables the detection of a termination of an over-current condition. Certain embodiments may be arranged to detect the termination of an over-current condition while the magnitude of the voltage across the diode decreased to a threshold value that is in the range of approximately a few tens of millivolts to a few hundred millivolts. Suitable threshold values depend on the substantially constant intrinsic forward voltage of diode D1.

Inductor L1, feedback sense resistor $R_{fbsns}$, and limit sense resistor $R_{limsns}$ may be of any values and types that are suitable for the requirements of a given implementation of regulator 290.

In other embodiments, regulator 290 includes a synchronous switch circuit (not shown in FIG. 2A) that is arranged to provide the flywheel current during certain operating modes. For example, the synchronous switch circuit may be switched during non-over-current condition operation of switch circuit 292 to perform synchronous load regulation. Also, synchronous switch circuit may be held open during over-current conditions such that current flows to inductor L1 from ground via diode D1. In other embodiments, synchronous switch circuit may be closed for a portion of the over-current condition and opened after a hold-off timer has expired, when over-current termination sensing is performed, and/or the like. These and other variations are within the spirit and scope of the invention.

In yet other embodiments, other current sensing circuits and techniques may be employed in conjunction with, or instead of, limit sense resistor $R_{limsns}$ and reference source 298 to sense the onset of an over-current condition. For example, a current controlled current source, current controlled voltage source, current sense transformer, current sense relay, current sense amplifier, magnetic flux sensors, and/or the like, and combinations thereof, may be suitably employed to sense a current associated with the regulator 290. In addition, elements of other known over-current protection circuitry may also be suitably employed to detect the onset of an over-current condition. Such detection may be based, at least in part on, switch circuit input current, switch circuit output current, inductor current, flywheel current, load current, and/or the like.

In addition, other feedback sensing circuit and techniques may be employed in conjunction with, or instead of, limit sense resistor $R_{fbsns}$ to control non-over-current condition output regulation. For example, feedback signal FB may be determined based, at least in part on, the current through inductor L1, between inductor L1 and load 294, between diode D1 and inductor L1, and/or the like.

Figure 2B:
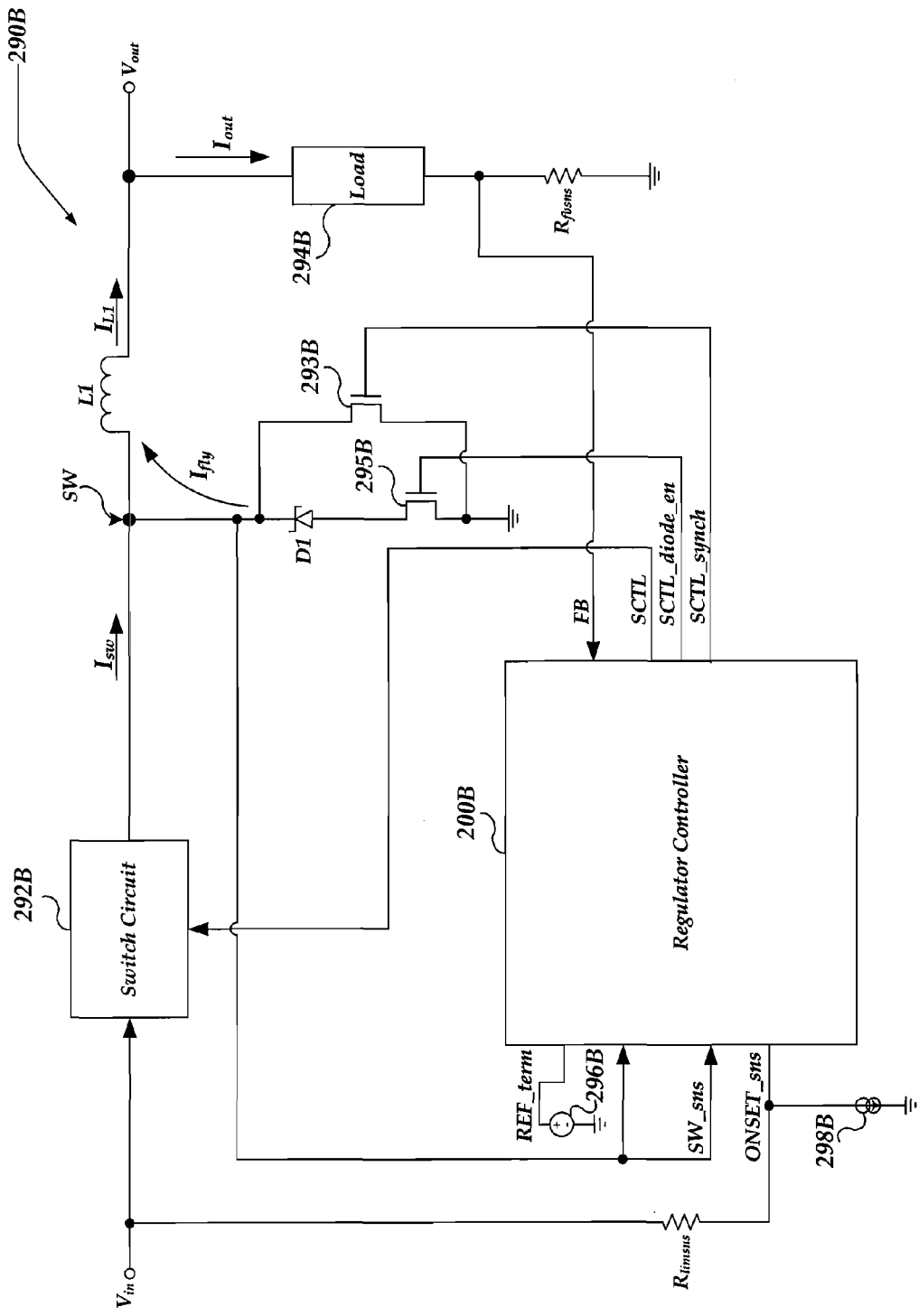

FIG. 2B is a block diagram of an embodiment of current regulator 290B. Regulator 290B includes regulator controller 200B, switch circuit 292B, synchronous switch 293B, load 294B, diode enable switch 295B, reference sources 296B-298B, inductor L1, diode D1, feedback sense resistor $R_{fbsns}$, and limit sense resistor $R_{limsns}$.

In one embodiment, synchronous switch 293B is arranged to selectively couple node SW to ground under the control of synchronous switch control signal SCTL_synch. In this embodiment, synchronous switch 293B consists of one or more switch transistors. In one embodiment, synchronous switch 293B is an N-channel MOSFET device. However, P-channel MOSFET devices, BJT transistors, JFET transistors, relays, and/or other electrically controlled switching devices may also be suitably used in this or other embodiments.

In one embodiment, diode enable switch 295B is arranged to selectively provide a current path between ground and diode D1 under the control of diode enable switch control SCTL_diode_en. For example, when diode enable switch 295B is closed, a current path is provided from ground, through diode D1, to inductor L1. When diode enable switch 295B is open, diode D1 is essentially disabled. In this embodiment, diode enable switch 295B consists of one or more switch transistors, such as those discussed above. In other embodiments, diode enable switch 295B may be coupled between diode D1 and node SW to function in a substantially similar manner.

Embodiments of current regulator 290B include a synchronous switch 293B coupled in parallel with diode D1. In these embodiments, regulator controller 200B may be arranged to provide synchronous switch control signal SCTL_synch for performing non-over-current mode synchronous regulation. In one example, signal SCTL_synch may be asserted to close synchronous switch 293B, as discussed above.

Figure 3:
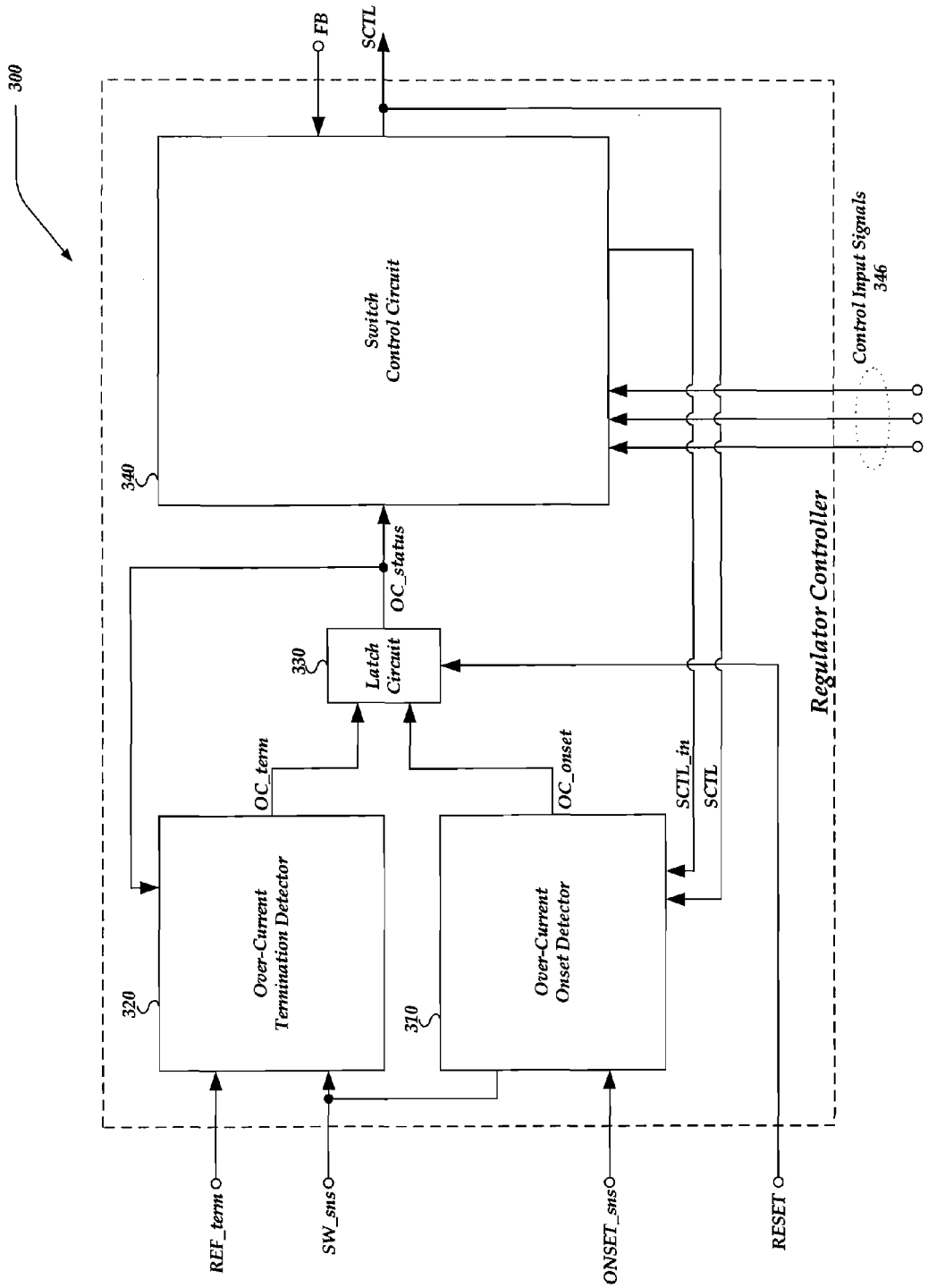
FIG. 3 is a block diagram of another embodiment of a regulator controller according to aspects of the present invention.

Also, diode enable switch 295B may be employed in conjunction with synchronous circuit 293B to select an operating mode. For example, the diode enable switch 295B may be open during non-over-current condition operation off-time of switch circuit 292B such that regulator controller 200 operates as a synchronous switching regulator. Also, diode enable switch 295B may be closed during over-current conditions such that current flows to inductor L1 from ground via diode D1. In other embodiments, diode enable switch 295B may be open for a portion of the over-current condition and closed after a hold-off timer has expired, when over-current termination sensing is performed, and/or the like. These and other variations are within the spirit and scope of the invention. FIG. 3 is a block diagram of an embodiment of regulator controller 300. Regulator controller 300 may be employed as an embodiment of regulator controller 100 of FIG. 1. Regulator controller 300 includes over-current onset detector 310, over-current termination detector 320, latch circuit 330, and switch control circuit 340. Regulator controller 300 is arranged to receive reset signal RESET, control input signals 346, and input signals REF_term, SW_sns, ONSET_sns and FB; and is further arranged to provide switch control signal SCTL.

Over-current onset detector 310 is arranged to receive over-current onset sense signal ONSET_sns and input signals SW_sns, SCTL, and switch control driver input signal SCTL_in to; and is further arranged to provide over-current onset detection signal OC_onset to latch circuit 330. In one embodiment, over-current onset detector 310 is arranged to gate or otherwise suppress the output of over-current onset detection signal OC_onset for a hold-off period of time after switch control signal SCTL is asserted. This hold-off period may be defined, for example, to reduce the likelihood of over-current onset detector 320 incorrectly detecting an over-current condition based on inrush current following the opening of a switch circuit. In another embodiment, over-current onset detector 310 is arranged to receive another input signal such as SCTL_in to, for example, only detect over-current conditions during the switch circuit on-time.

Over-current termination detector 320 is arranged to receive over-current termination threshold signal REF_term, switch node sense signal SW_sns, and over-current condition status signal OC_status; and is further arranged to provide over-current termination detection signal OC_term to latch circuit 330. In certain embodiments, over-current termination detector 320 is arranged to gate or otherwise suppress the output of over-current termination detection signal OC_term for a hold-off period after signal OC_status is asserted. This hold-off period may be defined, for example, to reduce the likelihood that over-current termination detector 320 incorrectly detects a termination of an over-current condition based on switching delays or transient noise on switch node SW (see FIG. 6). In other embodiments, over-current termination detector 320 may receive and employ signals SCTL, OC_onset, and/or the like, to provide similar functionality.

Latch circuit 330 is arranged to receive reset signal RESET, over-current onset detection signal OC_onset and over-current termination detection signal OC_term. Latch circuit 330 is further arranged to provide over-current condition status signal OC_status to switch control circuit 340.

In one embodiment, latch circuit 330 is arranged to receive reset signal RESET. In one embodiment, latch circuit 330 is cleared when signal RESET is asserted. Signal reset may be provided by an internal or external circuit, device, system, and/or the like, and may be asserted, for example, during start up, before shut down, following a mode change, before a mode change, and/or at any other suitable time. In other embodiments, over-current onset detector 310, over-current termination detector 320, switch control circuit 340, and/or other circuitry may be arranged to receive signal RESET, and may be arranged to clear timers, counters, state-machines, flip-flops, latches, and/or the like, based on signal RESET.

In one embodiment, switch control circuit 340 is arranged to receive control input signals 346, signals OC_status and FB; and is further arranged to provide signals SCTL and SCTL_in. Control input signals 346 may include clock signals, various reference voltages, temperature limits or indicators, compensation signals, mode selection signals, reset signals, and/or the like. In at least one embodiment, switch control circuit 340 includes additional logic, circuitry, and/or the like, which is arranged to change operational modes of, shut-down, start-up, reset, switch, and/or the like, switch control circuit 340 based on control input signals 346. In one embodiment, switch control circuit 340 is also arranged to provide an output signal such as SCTL_in to, for example, provide a digital representation of the status of switch control signal SCTL. Also, control input signals 346 may include any number of control input signals. For example, control input signals 346 may include zero, two, three, seven, and/or the like, number of control input signals.

Figure 4:
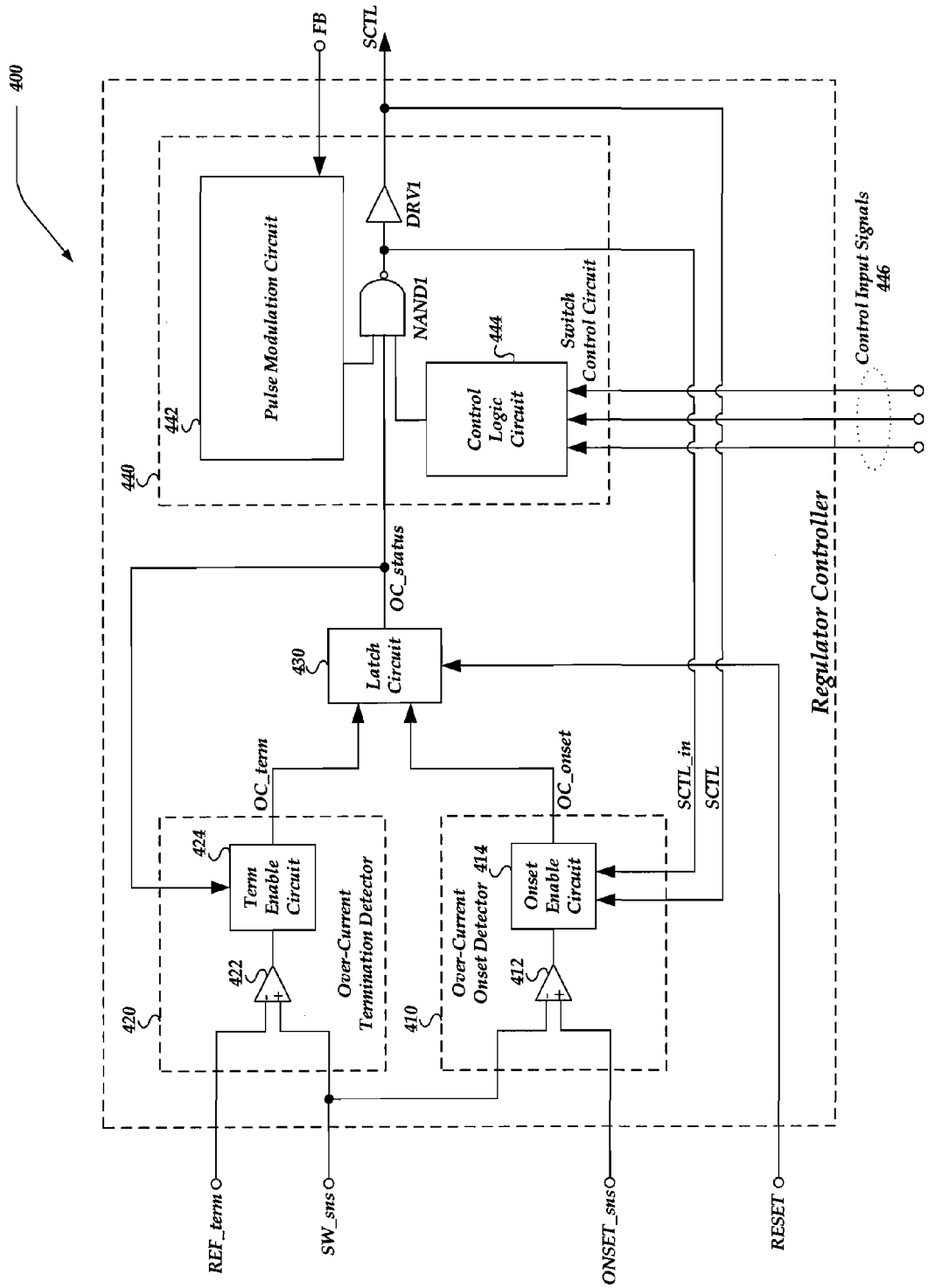
FIG. 4 is a block diagram of yet another embodiment of a regulator controller according to aspects of the present invention.

FIG. 4 is a block diagram of an embodiment of regulator controller 400. Regulator controller 400 may be employed as an embodiment of regulator controller 100 of FIG. 1. Regulator controller 400 includes over-current onset detector 410, over-current termination detector 420, latch circuit 430, and switch control circuit 440. Regulator controller 400 is arranged to receive signal RESET, control input signals 446, and signals REF_term, SW_sns, ONSET_sns and FB; and is further arranged to provide signal SCTL.

Over-current onset detector 410 includes comparison circuit 412 and onset enable circuit 414. In one embodiment, comparison circuit 412 is arranged to receive signal SW_sns and signal ONSET_sns; and is further arranged to provide a comparison output to onset enable circuit 414. In some embodiments, comparison circuit 412 includes a comparator that is arranged to output a logical one when signal ONSET_sns signal is greater than the voltage on signal SW_sns and to output a logical zero when the voltage on over-current onset sense signal ONSET_sns signal is less than the voltage on switch node sense signal SW_sns. In this embodiment, switch node sense signal SW_sns functions as a reference signal. In other embodiments, an internal or external reference source may also be used. In certain embodiments, the output of comparison circuit 414 may be inverted or comparison circuit 414 may include an error amplifier, a hysteretic comparator, a differential amplifier, and/or the like.

In at least one embodiment, comparison circuit 414 includes a reference current source, such as current source 298 of FIG. 2.

In one embodiment, onset enable circuit 414 is arranged to receive the output of comparison circuit 412, and signals SCTL and SCTL_in; and is further arranged to gate or otherwise suppress the output of over-current onset detection signal OC_term for a hold-off period after switch control signal SCTL is asserted.

Over-current termination detector 420 includes comparison circuit 422 and termination enable circuit 424. Comparison circuit 422 may be similar to comparison circuit 412 of over-current onset detector 410.

As show in FIG. 4, one embodiment of termination enable circuit 424 is arranged to receive the output of comparison circuit 422 and signal OC_status, and to provide over-current termination detection signal OC_term. In certain embodiments, termination enable circuit 424 is arranged to gate or otherwise suppress the output of over-current termination detection signal OC_term based, at least in part, on signal OC_onset or signal OC_status.

In at least one embodiment, over-current termination detector 320 includes a voltage reference such as voltage reference 296 of FIG. 2.

Switch control circuit 440 includes pulse modulation circuit 442, control logic circuit 444, NAND gate NAND1, and driver DRV1. In certain embodiments, switch control signal is based, at least in part, on the output of pulse modulation circuit 442. Pulse modulation circuit 442 may be a pulse width modulation circuit, a pulse frequency modulation circuit, and/or the like.

In one embodiment, control logic circuit 444 is arranged to provide additional control logic to limit or otherwise modify the output of regulator controller 400. In certain embodiment, control logic circuit may include flip-flops, latches, state machines, microcontrollers, microprocessors, combinatorial logic, programmable logic, and/or the like. For example, control logic circuit 444 may be arranged to provide mode control, temperature protection, current control, voltage control, clocking, and/or other regulator control functionality.

In an embodiment such as shown in FIG. 4, NAND gate NAND1 is arranged to gate the output of switching circuit 442 with the outputs of latch circuit 430 and control logic circuit 444. In other embodiments, NAND gate NAND1 may be replaced with an AND gate or other combinatorial or state based logic. Also, gating and other functionality may be provided by control logic circuit 444, and/or other circuitry.

Driver DRV1 is arranged to receive switch control input signal SCTL_in and to provide switch control signal SCTL. In one embodiment, signal SCTL is generated by buffering SCTL_in. In other embodiments, delay circuits, logic circuits, state machines, and/or the like, may be suitably employed. In at least one embodiment, driver circuit DRV1 is external to regulator controller 400.

Figure 5:
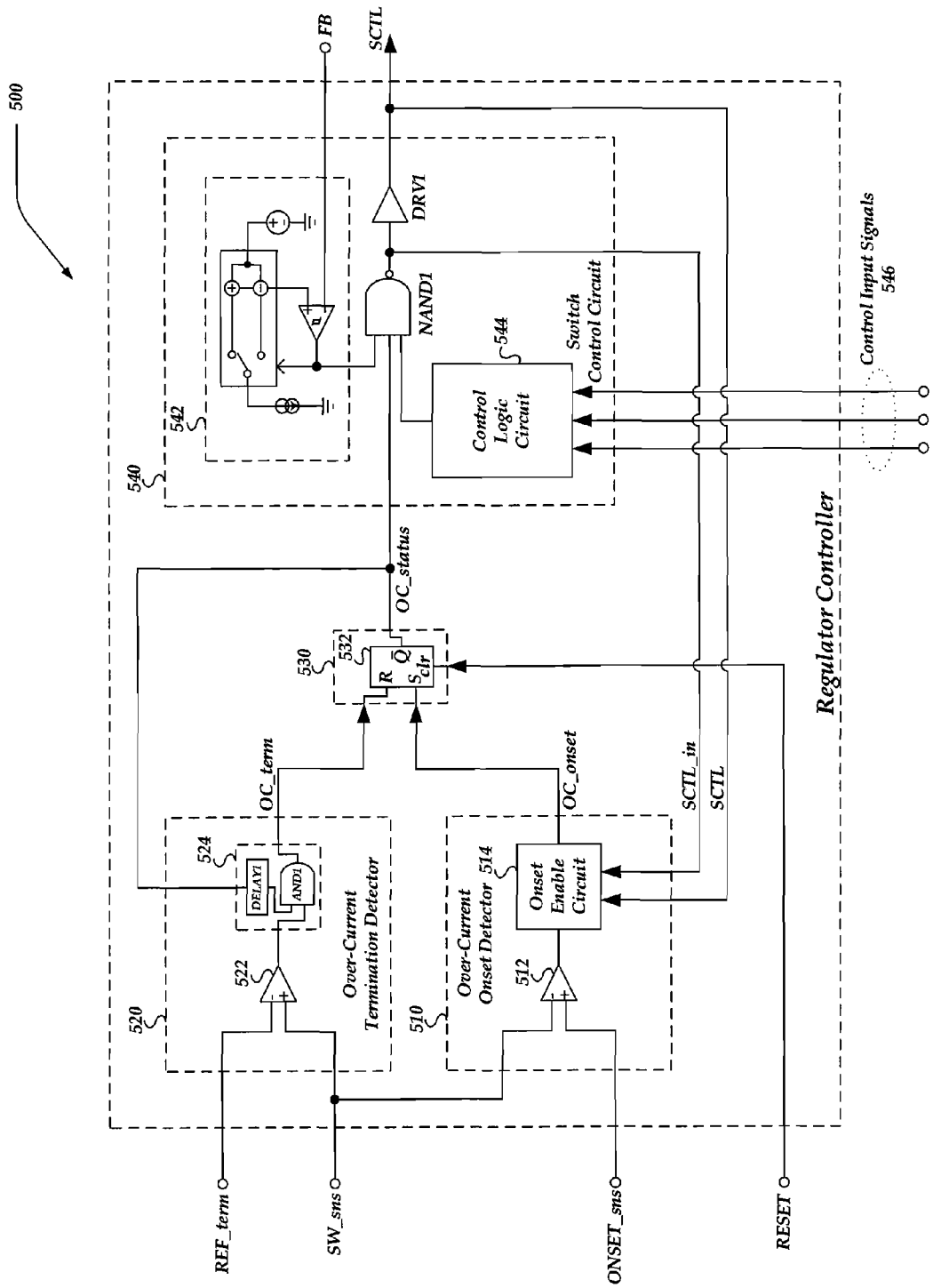
FIG. 5 is a schematic diagram of one embodiment of a regulator controller according to aspects of the present invention.

FIG. 5 is a block diagram of an embodiment of regulator controller 500. Regulator controller 500 may be employed as an embodiment of regulator controller 100 of FIG. 1. Regulator controller 500 includes over-current onset detector 510, over-current termination detector 520, latch circuit 530, and switch control circuit 540. Regulator controller 500 is arranged to receive control input signals 546, signals RESET, REF_term, SW_sns, ONSET_sns and FB; and is further arranged to provide switch control signal SCTL.

FIG. 5 illustrates one embodiment of termination enable circuit 524. One embodiment of termination enable circuit 514 includes delay circuit DELAY1 and AND gate AND1. In one embodiment, delay circuit DELAY1 is arranged to provide a delayed output based, at least in part on, signal OC_status. For example, delay circuit DELAY1 may be arranged to assert an output after a hold-off period of approximately three microseconds after signal OC_onset or signal OC_status is asserted. This hold-off period may be controlled by a capacitor based timing circuit, a timer, a counter, and/or the like. In addition, any hold-off time or enable circuit may be employed to, for example, prevent incorrect detection of over-current condition termination based on switching delays, noise, ringing, and/or the like. In one embodiment, AND gate AND1 is arranged to gate or otherwise suppress the output of over-current termination detection signal OC_term based on the output of delay circuit DELAY1. In other embodiments, other combinatorial and/or state based logic circuits are suitably employed.

Latch circuit 530 is arranged to receive signals RESET, OC_onset, and OC_term; and to provide output signal OC_status to switch control circuit 540. In one embodiment, latch circuit 530 includes RS latch 532 which includes a reset input clr. However, in other embodiments, any suitable type of latching circuit may be employed. For example, other flip-flops, latches, state machines, and/or the like, may be combined with combinatorial logic, as appropriate. In one embodiment, RS latch 532 is arranged such that signal OC_term is connected to an R input, signal OC_onset is connected to an S input, and signal OC_status is connected to an inverted Q output.

FIG. 5 illustrates a hysteretic controller employed as switching circuit 542. In other embodiments, switching circuit may be a PWM controller, a PFM controller, a constant-on-time controller, a constant-off-time controller, and/or the like.

Also, other variations are within the spirit and scope of the invention. For example, embodiments of the invention can be used with and in switching regulators having non-ground-referenced diodes. In these embodiments, differential amplifiers, instrumentation amplifiers, differential sensing, digital-to-analog converters, and/or the like, may be employed to measure the voltage across the diode.

In another example, embodiments of the invention can be used with and in switching voltage regulators. In these embodiments, it may be beneficial to lengthen the hold-off time following the assertion of over-current detection signal OC_onset. In these and other embodiments, digital timer circuits, counters, clock circuits, and/or the like, may be suitably employed.

FIGS. 6A-6E are timing diagrams illustrating waveforms of embodiments of over-current onset detection signal OC_onset, switch node sense signal SW_sns, over-current condition status signal OC_status, over-current termination detection disable signal OC_term_dis, and over-current termination detection signal OC_term, respectively, of one embodiment of a regulator controller according to aspects of the present invention. For example, FIGS. 6A-6E represents aspects of the operation of regulator controller 500 of FIG. 5. These and other regulator controllers are within the spirit and scope of the invention.

Prior to start time 605, regulator controller 500 is operating in a non-over-current condition and is regulating switch control signal SCTL based, at least in part, on the value on feedback signal FB. At time 615, over-current onset detector 510 detects the onset of an over-current condition and asserts over-current onset detection signal OC_onset. Latch circuit 530 latches over-current onset detection signal OC_onset and asserts over-current status signal OC_status. During the time period following the onset of an over-current condition, the voltage at switch node SW and on signal SW_sns may be unstable. In some embodiments, switching, ringing, transients, noise, and/or the like, may cause the voltage at switch node SW to be greater than over-current termination threshold signal REF_term at certain times. For example, the voltage at switch node SW may take a length of time to fall below the voltage on signal REF_term or may exhibit ringing. During a hold-off time, assertion of over-current termination detection signal OC_term is gated or otherwise suppressed.

At time 615, a suitable hold-off time $T_{dis}$ has elapsed since the over-current onset was detected, signal OC_term_dis is the de-asserted and assertion of over-current termination detection signal OC_term is enabled. In one embodiment, over-current termination detection disable signal OC_term_dis is an internal signal (not shown) of enable circuit 524 of FIG. 5 and is employed to gate the assertion of over-current termination detection signal OC_term.

At time 625, over-current termination detector 520 detects that the voltage at switch node SW has risen above the voltage on signal REF_term and asserts over-current termination detection signal OC_term to indicate the end of the over-current condition. Latch circuit 530 then clears over-current status signal OC_status and regulator controller 500 resumes non-over-current condition operation.

The above specification, examples and data provide a description of the apparatus, method, and use of thereof of the invention. Since many embodiments of the invention can be made without departing from the spirit and scope of the invention, the invention also resides in the claims hereinafter appended.

What is claimed as new and desired to be protected by Letters Patent of the United States is:

1. A circuit for limiting an output current, comprising:
a constant current regulator, including:
a switch circuit that is arranged to receive a switch control signal, and to selectively provide power to an output node; and
a regulator controller that is arranged to provide the switch control signal to the switch circuit, to detect an onset of an over-current condition associated with the switch circuit, and to detect a termination of the over-current condition, wherein the regulator controller is arranged such that the switch control signal is de-asserted during the over-current condition; the termination of the over current condition is detected based, at least in part, on a voltage across a diode decreasing to a termination threshold value; the diode has a substantially constant intrinsic forward voltage while forward biased; and wherein the termination threshold is less than the substantially constant intrinsic forward voltage of the diode.

2. The circuit of claim 1, further comprising:
a voltage reference source that is arranged to provide the termination threshold value.

3. The circuit of claim 1, wherein the regulator controller is at least one of a current regulator controller or a voltage regulator controller.

4. The circuit of claim 1, wherein the circuit is at least one of a hysteretic regulator, a pulse width modulated regulator, or a constant-on-time regulator.

5. The circuit of claim 1, wherein the threshold termination value is a magnitude of a voltage that is in a range of about 50 millivolts to 300 millivolts.

6. The circuit of claim 1, wherein the constant current regulator further includes:
a catch diode that is connected to a switch node and is arranged to provide a current to an output inductor for at least a portion of the time that the switch circuit is open, wherein the catch diode is the diode, and wherein the circuit is a buck mode regulator.

7. The circuit of claim 6, wherein the catch diode is a Schottky diode having an anode coupled to a ground potential and a cathode coupled to the switch node.

8. The circuit of claim 6, wherein the constant current regulator further includes:
a synchronous switch that is coupled to a switch node and is arranged to selectively provide a current to an output inductor, wherein the regulator controller is arranged to selectively open and close the synchronous switch such that the synchronous switch is closed for at least a portion of the time during the over-current condition.

9. A circuit for limiting an output current, comprising:
a constant current regulator, including:
an over-current onset detector that is arranged to receive a current sense signal and to provide an over-current onset signal such that the over-current onset signal is asserted if an onset of an over-current condition is detected;
an over-current termination detector that is arranged to receive a voltage sense signal that is based, at least in part, on a voltage across a diode of a regulator; and is further to provide an over-current termination signal, wherein the diode has a substantially constant intrinsic forward voltage while forward biased; wherein the over-current termination detector is arranged such that if the voltage across the diode decreases to a termination threshold value, the over-current termination signal is asserted; and wherein the termination threshold is less than the substantially constant intrinsic forward voltage; and
a latch circuit that is arranged to receive the over-current onset signal and the over-current termination signal and to provide an over-current status signal.

10. The circuit of claim 9, wherein the constant current regulator further includes:
a switch control circuit that is arranged to receive the over-current status signal and to provide a switch control signal, wherein the switch control circuit includes:
a pulse modulation circuit that is arranged to receive a feedback signal and to provide a modulation signal, wherein the switch control circuit is arranged to provide a switch control signal based, at least in part, on the over-current status signal and the modulation signal.

11. The circuit of claim 9, wherein the over-current termination detector includes:
a voltage reference that is arranged to provide a voltage reference signal; and
a comparison circuit that is arranged to compare the voltage reference signal with the voltage sense signal. and arranged to assert the over-current termination signal if the magnitude of the voltage sense signal is less than the magnitude of the voltage reference signal.

12. The circuit of claim 9, wherein the over-current onset detector includes:
an enable circuit that is arranged such that the over-current onset signal is not asserted during an over-current onset hold-off period following the assertion of the switch control signal.

13. The circuit of claim 10, wherein the switch control circuit includes:
a hysteretic current regulator control circuit that is arranged such that while the over-current status signal is de-asserted:

if a feedback signal is less than a low threshold, the switch control signal is asserted; and if the feedback signal is greater than a high threshold, the switch control signal is de-asserted.

14. The circuit of claim 9, wherein the over-current termination detector includes:

a delay circuit that is arranged such that the over-current termination signal is not asserted during an over-current termination hold-off period following the assertion of the over-current onset signal.

15. The circuit of claim 14, wherein the delay circuit includes:

a capacitor that is arranged such that a voltage of the capacitor is representative of a length of time since the over-current onset signal has been asserted.

16. The circuit of claim 14, wherein the delay circuit includes:

a counter circuit that is arranged to count a of a length of time since the over-current onset signal has been asserted.

17. A method of limiting an output current, comprising:

performing constant current regulation, including:

receiving a current sense signal;

receiving a feedback signal;

receiving a diode voltage signal that represents a voltage across a diode, wherein if the diode forward biased, the diode has a substantially constant intrinsic forward voltage;

providing an over-current onset signal based, at least in part, on the current sense signal;

providing an over-current termination signal, including:

if the diode voltage signal decreases to a termination threshold value, asserting the over-current termination signal, wherein the termination threshold is less than the substantially constant intrinsic forward voltage; and providing an over-current condition status signal, wherein the over-current status signal is based, at least in part, on the over-current onset signal and the over-current termination signals; and regulating an output signal, including:

providing a switch control signal such that:

if the over-current status signal is asserted, de-asserting the switch control signal; and if the over-current status signal is de-asserted, providing the switch control signal based, at least in part, on the feedback signal; and employing the switch control signal to regulate an output signal.

18. The method of claim 17, wherein providing the switch control signal further includes:

employing hysteretic regulation control such that while the over-current status signal is de-asserted:

if a feedback signal is less than a low threshold, the switch control signal is asserted; and if the feedback signal is greater than a high threshold, the switch control signal is de-asserted.

19. The method of claim 17, wherein providing the over-current termination signal further includes:

delaying the assertion of the over-current termination signal during an over-current termination hold-off period following the assertion of the over-current onset signal.

20. The method of claim 17, wherein the diode is a Schottky catch diode having an anode coupled to a ground potential and a cathode coupled to a switch node of a buck mode current regulator such that the diode is arranged to provide a current to an output inductor for at least a portion of the time that the switch control signal is de-asserted.

* * * * *

UNITED STATES PATENT AND TRADEMARK OFFICE
CERTIFICATE OF CORRECTION

PATENT NO. : 7,826,191 B1
APPLICATION NO. : 11/748317
DATED : November 2, 2010
INVENTOR(S) : Allan A. Fisher et al.

It is certified that error appears in the above-identified patent and that said Letters Patent is hereby corrected as shown below:

In column 3, line 56, delete "de- assert" and insert -- de-assert --, therefor.

In column 11, line 44, in claim 1, delete "over current" and insert -- over-current --, therefor.

In column 12, line 53, in claim 11, delete "signal." and insert -- signal, --, therefor.

In column 13, line 18, in claim 16, delete "a of a" and insert -- of a --, therefor.

Signed and Sealed this
Tenth Day of May, 2011

David J. Kappos
*Director of the United States Patent and Trademark Office*